United States Patent
Ray

(10) Patent No.: US 11,853,719 B1
(45) Date of Patent: Dec. 26, 2023

(54) RANDOM NUMBER GENERATION SYSTEMS AND METHODS

(71) Applicant: Biswajit Ray, Huntsville, AL (US)

(72) Inventor: Biswajit Ray, Huntsville, AL (US)

(73) Assignee: Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 1161 days.

(21) Appl. No.: 16/403,118

(22) Filed: May 3, 2019

Related U.S. Application Data

(60) Provisional application No. 62/666,438, filed on May 3, 2018.

(51) Int. Cl.
    *G06F 7/58* (2006.01)

(52) U.S. Cl.
    CPC ............... *G06F 7/58* (2013.01); *G06F 7/588* (2013.01)

(58) Field of Classification Search
    CPC ................................. G06F 7/58; G06F 7/588
    See application file for complete search history.

(56) References Cited

U.S. PATENT DOCUMENTS

| | | | | |
|---|---|---|---|---|
| 6,369,727 | B1* | 4/2002 | Vincze | G06J 1/00 341/131 |
| 7,634,522 | B1* | 12/2009 | Carter | H04L 9/0869 708/250 |
| 9,087,593 | B2* | 7/2015 | Wang | G01R 33/098 |
| 2004/0267844 | A1* | 12/2004 | Harding | G06F 7/588 708/250 |
| 2007/0176691 | A1* | 8/2007 | Batchelor | H03L 7/23 331/16 |
| 2015/0193204 | A1* | 7/2015 | Lin | G06F 7/588 708/250 |

(Continued)

FOREIGN PATENT DOCUMENTS

| | | | | |
|---|---|---|---|---|
| CN | 206278280 U | * | 6/2017 | |
| EP | 1855191 A2 | * | 11/2007 | ............. G06F 7/588 |

OTHER PUBLICATIONS

A. Ghetti et al., "Comprehensive Analysis of Random Telegraph Noise Instability and Its Scaling in Deca-Nanometer Flash Memories," IEEE Trans. Electron Devices, vol. 56, No. 8, Aug. 2009, pp. 1746-1752.

(Continued)

*Primary Examiner* — Michael R Vaughan
*Assistant Examiner* — Abdullah Almamun
(74) *Attorney, Agent, or Firm* — Maynard Nexsen PC; Brian T. Sattizahn

(57) ABSTRACT

An exemplary random number generation system leverages the r includes at least one solar power panel of a solar power system, at least one sensor and a random number generator. The sensor senses one or more output parameters (e.g., voltage or current) from the solar power system and provides the sensed parameter to the random number generator, which uses the sensed parameter to generate a number that is truly random (i.e., is not deterministic). As an example, the random number generator may receive multiple samples of the measured parameter and generate a random number based on a difference of the multiple samples. If desired, the random number generator may include an algorithm to remove biasing in the random number.

16 Claims, 4 Drawing Sheets

(56) References Cited

U.S. PATENT DOCUMENTS

2016/0062734 A1* 3/2016 Love ................ G06F 7/588
708/250
2016/0315763 A1* 10/2016 Hammon ............ H04L 9/0656
2020/0195276 A1* 6/2020 Wu .................... H03M 13/251
2021/0019429 A1* 1/2021 Cooner ................ G01J 1/4204
2021/0314143 A1* 10/2021 Conner ................ H04L 63/067

OTHER PUBLICATIONS

B. Ray et al., "True Random Number Generation Using Read Noise of Flash Memory Cells," IEEE Trans. Electron Devices, vol. 65, No. 3., Mar. 2018. pp. 963-969.
C. M. Compagnoni, et al.,"Random Telegraph Noise Effect on the Programmed Threshold-Voltage Distribution of Flash Memories," IEEE Electron Device Lett., vol. 30, No. 9, Sep. 2009, pp. 984-986.
H. Kurata et al., "Random Telegraph Signal in Flash Memory: Its impact on Scaling of Multilevel Flash Memory Beyond the 90-nm Node," IEEE j. Solid-State Circuits, vol. 42, No. 6, Jun. 2007, pp. 1362-1369.
L. E. Bassham et al., "A Statistical Test Suite for Random and Pseudorandom Number Generators for Cryptographic Applications," Spec. Publ. NIST SP—800-22 Rev la, Sep. 2010, 131 pages.
S. M. Joe et al., "Threshold Voltage Fluctuation by Random Telegraph Noise in Floating Gate NAND Flash Memory String," IEEE Trans. Electron Devices, vol. 58, No. 1, Jan. 2011, pp. 67-73.
S. H. Bae et al., "The 1/f Noise and Random Telegraph Noise Characteristics in Floating-Gate NAND Flash Memories," IEEE Trans. Electron Devices, vol. 56, No. 8, Aug. 2009, pp. 1624-1630.
T. Ristenpart et al., "When Good Randomness Goes Bad: Virtual Machine Reset Vulnerabilities and Hedging Deployed Cryptography," in Ndss '10 (network and Distributed Security Symposium), 2010, 18 pages.
V. Raghunathan et al., "Design Considerations for Solar Energy Harvesting Wireless Embedded Systems", Fourth International Symposium on Information Processing in Sensor Networks, May 5, 2005, 04 pages.

* cited by examiner

RANDOM NUMBER GENERATION SYSTEMS AND METHODS

CROSS REFERENCE TO RELATED APPLICATION

This application claims priority to U.S. Provisional Application No. 62/666,438, entitled "True Random Number Generator Using Solar Output Characteristics" and filed on May 3, 2018, which is incorporated herein by reference.

RELATED ART

Many modern systems, such as remote sensor networks, edge computing applications, and unmanned aerial vehicles (referred to hereinafter as "UAV"), generate and process sensitive data. In such systems, communication needs to be secure and prevent interception of sensitive data by unauthorized recipients.

Data encryption is one techniques that is often used to secure the communication of sensitive data. Data encryption algorithms and other types of algorithms for securing and protecting sensitive data often use one or more randomly generated numbers. To enhance the security of the information being protected, it is desirable for the random numbers generated for these data encryption and other algorithms to be truly random.

Unfortunately, the numbers generated by many conventional random number generators are not always truly random. That is, the algorithms used to generate the random numbers are often deterministic such that the generated numbers are actually pseudo random, thereby making such numbers more susceptible to hacking attempts. If a hacker or other unauthorized user is able to recover a random number used in an encryption algorithm, it is more likely that the hacker or other unauthorized user will be able to break the encryption and recover the protected data. To help protect against this risk, many random number generators capable of generating numbers that are truly random have been developed, but these random number generators are often complex and expensive. In addition, these random number generators often use certain highly-random seed values that are not always available in certain applications. Moreover, better techniques for generating random numbers for various applications are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure pertains to systems and methods for generating random numbers. In an exemplary embodiment, a random number generation system (referred to hereinafter as "RNG system") may generate one or more random numbers based on the output characteristics of a solar power system. Such output characteristics vary randomly due to many factors including random variations in (1) the intensity of sunlight incident on solar power panels, (2) the electrical circuits used to process solar power, and (3) temperature. An exemplary random number generation system includes at least one solar power panel, at least one sensor and a random number generator. The sensor senses one or more output parameters (e.g., voltage or current) from the solar power system and provides the sensed parameter to the random number generator, which uses the sensed parameter to generate a number that is truly random (i.e., is not deterministic). As an example, the random number generator may receive multiple samples of the measured parameter and generate a random number based on a difference of the multiple samples. If desired, the exemplary RNG may implement an algorithm to remove biasing in the random number.

As mentioned earlier, many of conventional random number generators capable of generating truly random numbers are relatively complex requiring dedicated circuitry for random number generation. For space-constrained and resource-constrained systems, such as UAVs or other aircraft or spacecraft, for example, accommodating a relatively large circuit for generating random numbers may not be feasible or desirable. Further, deployment of the existing random number generators may require changes in design of the systems, thereby increasing associated redesign costs, and may undesirably increase complexity of the system. On the other hand, exemplary random number generators, as disclosed herein, may leverage existing circuitry in a solar power system in order to decrease its space and cost requirements.

Figure 1:
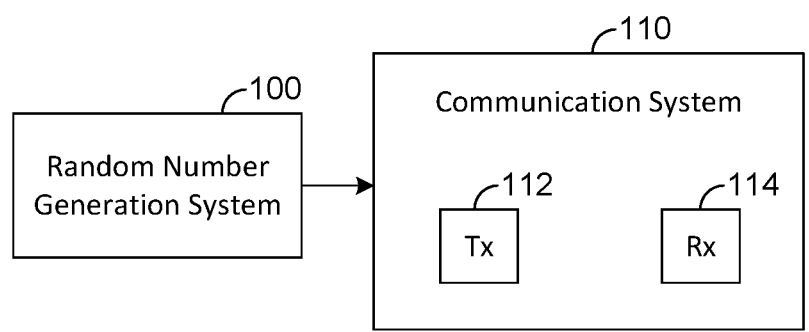
FIG. 1 is a block diagram depicting an exemplary embodiment of a secure communication system.

FIG. 1 is a block diagram of a random number generation system 100 that is configured to provide one or more random numbers to a communication system 110, which is configured to use the random numbers to communicate information. As an example, the random number generation system 100 and the communication system 110 may be implemented on a UAV where the communication system 110 uses random numbers from the random number generation system 100 to encrypt or decrypt data wirelessly communicated by the communication system 110. However, the random number generation system 100 may be used in other applications and the random numbers provided by the system 100 may be used for other purposes as may be desired.

In the exemplary embodiment depicted by FIG. 1, the communication system 110 has a transmitter 112 and a receiver 114 respectively configured to transmit and receive data. The transmitter 112 may use one or more random numbers from the random number generation system 100 to encrypt data for transmission by the transmitter 112, and the receiver 114 may use one or more random numbers from the random number generation system 100 to decrypt data received by the receiver 114.

In some embodiments, when the communication system 110 requires a random number for data encryption or decryption, or some other purpose, the communication system 110 communicates to the random number generation system 100 a value (e.g., a threshold) indicative of a minimum number of bits or, in other words, a minimum bit length for a random number sequence. Based on this threshold, the random number generation system 110 generates a random number with a sufficient number of bits to satisfy the threshold (e.g., a number of bits equal to or greater than the threshold), and the system 110 sends the random number to the communication system 110, which may then use the random number for encrypting or decrypting data or some other purpose.

Figure 2:
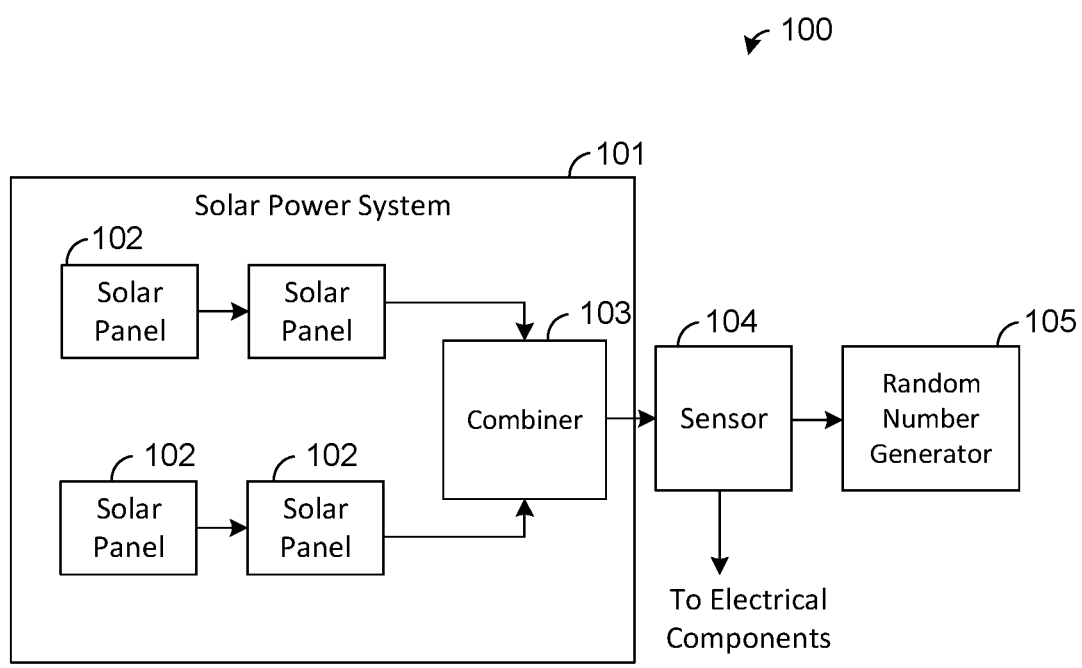
FIG. 2 is a block diagram depicting a random number generation system, such as is depicted by FIG. 1.

FIG. 2 depicts an exemplary embodiment of a random number generation system 100. The system 100 comprises a solar power system 101, at least one sensor 104 and a random number generator 105. The solar power system 101 has at least one solar power panel (also referred to for simplicity as "solar panel") 102 configured to convert solar power into electrical energy. In this regard, each solar panel 102, also sometimes referred to as a "photovoltaic panel," is configured to absorb light energy (e.g., sunlight) incident on the solar panel 102 and convert it to electrical energy. The electrical energy produced from the solar power system 101 may be used to power one or more electrical components.

In a preferred embodiment, such as is depicted by FIG. 1, the solar power system 101 may comprise one or more arrays of solar panels 102 with each array having a plurality of solar panels 102. In such embodiments, the solar power system 101 may include a combiner 103 to combine power signals output from each array of solar panels 102 and distribute it to power other electrical components. As an example, if the systems 100 are implemented on a UAV, electrical power from the combiner 103 may be used to power motors, lights, instruments, or other components of the UAV, including possibly components of the communication system 105. In other embodiments, power from the solar power system 101 may be used for other purposes.

In some embodiments, the solar power system 101 may comprise a single array of solar panels 102 or alternatively just a single solar panel 102. In such embodiments, the combiner 103 may not be required and hence, may not be included in the system 101. Moreover, any number of solar panels 102 are possible, and other configurations of the solar power system 101 may be used to provide electrical power.

Notably, the electrical characteristics of a power signal provided by the solar power system 101, such as the voltage or current of the power signal output by the combiner 103, varies randomly based on several factors, and the randomness of these characteristics may be exploited by the random number generator 105 in order to generate a number that is truly random without requiring complex and expensive (in terms of cost and/or area) circuitry similar to many conventional random number generators. In this regard, sunlight generated by the Sun varies in a random manner, and atmospheric conditions (air movement, clouds, etc.) through which the sunlight passes also varies. Thus, the intensity of sunlight incident on the solar panels 102 varies randomly. The electrical characteristics of the circuitry within the solar power panel system 101 also varies, particularly as the temperature of the solar panels 102 changes due to heat from sunlight and other atmospheric conditions. As a result of these and other factors, the output of each solar panel 102 and, therefore, the output of the combiner 103 vary randomly.

In the exemplary embodiment shown by FIG. 2, the sensor 104 is coupled to the combiner 103 and is configured to measure a parameter, such as voltage or current, of the combined power signal output by the combiner 103. The sensor 104 also transmits data indicative of this measured parameter to the random number generator 105, which then uses the data to generate a random number, as will be described in more detail below.

Figure 3:
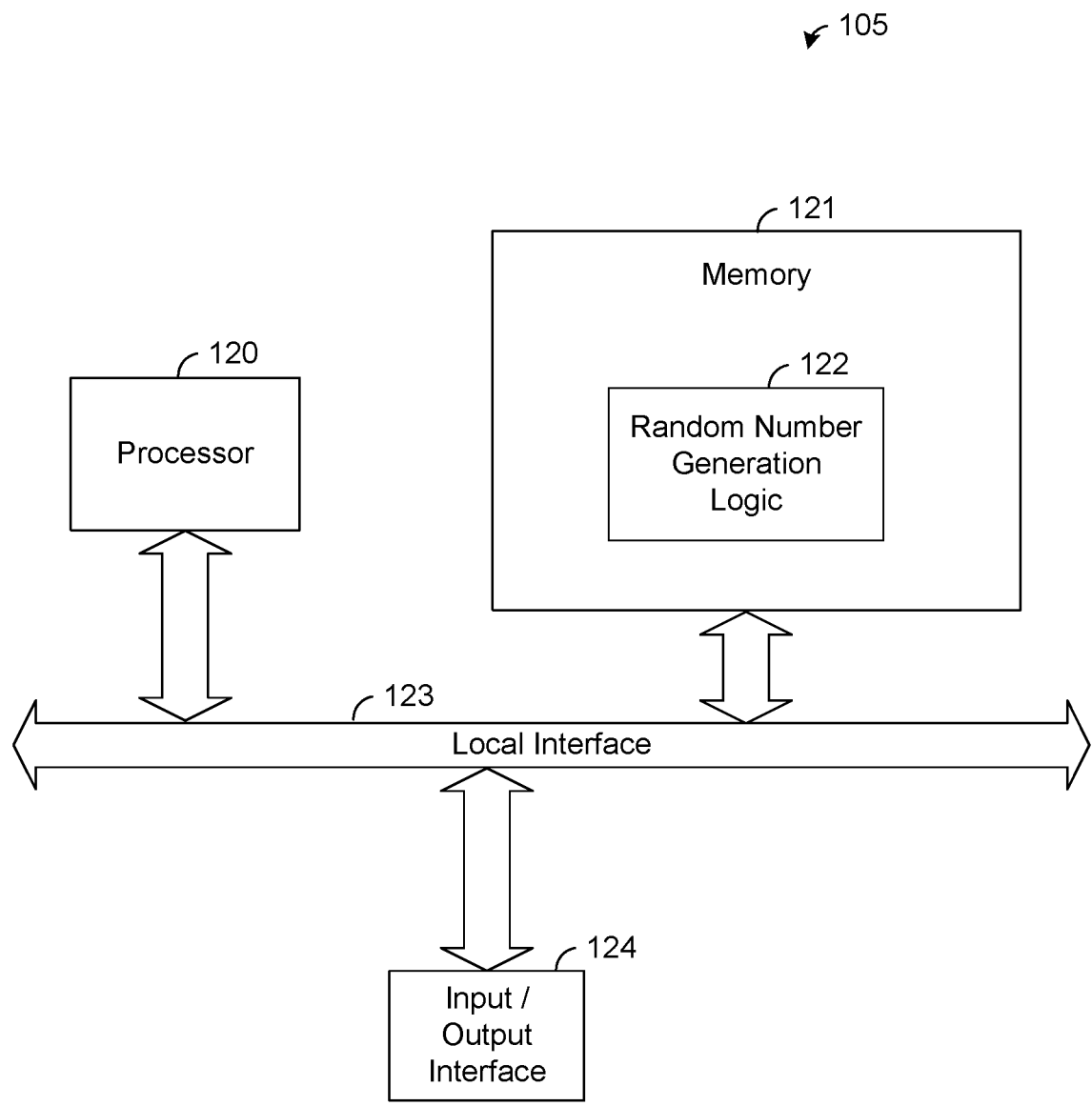
FIG. 3 depicts an exemplary embodiment of a random number generator, such as is depicted by FIG. 2.

FIG. 3 depicts an exemplary random number generator 105, which may be implemented in hardware (e.g., a field programmable gate array) or a combination of hardware and software. The exemplary random number generator 105 of FIG. 3 includes at least one conventional processor 120, which comprises processing hardware for executing instructions stored in memory 121. As an example, the processor 120 may comprise a central processing unit (CPU) or a digital signal processor (DSP). In the depicted embodiment, the random number generator 105 may be a micro-controller or other type of controller or device for executing instructions.

The processor 120 communicates to and drives other elements within the generator 105 via a local interface 123, which can include at least one bus. The random number generator 105 includes an input/output interface 124 to receive input signals or send output signals to other components. As an example, the input interface may be configured to receive a signal from the sensor 104 and the output interface may be configured to send output signals to the communication system 110. In other embodiments, the input/output interface may send/receive signals to/from other components.

The random number generator 105 comprises logic 122, referred to hereafter as "random number generation logic" 122, which may be implemented in software, firmware, hardware, or any combination thereof. In the exemplary embodiment shown by FIG. 3, the random number generation logic 122 is implemented in software and stored in memory 121. The random number generation logic 105 may be configured to control the operation of the random number generator 105 and in particular, may be configured to generate random numbers, as will be described below.

Note that the logic 122 when implemented in software, can be stored and transported on any computer-readable medium for use by or in connection with an instruction execution apparatus that can fetch and execute instructions. In the context of this document, a "computer-readable medium" can be any means that can contain or store code for use by or in connection with the instruction execution apparatus.

As mentioned above, the random number generation logic 122 may be configured to generate at least one random number according to a random number generation algorithm based on the input received from the sensor 104. As indicated above, such input may include one or more measurements of a characteristic of a power signal from the combiner 103. Note that it is possible for a power signal from one or more solar panels 102 to be measured without the use of a combiner 103 or before such power signal has been processed by the combiner 103. That is, measuring the output of the combiner 103 is unnecessary in all embodiments.

In some embodiments, it is possible for the random number generation logic 122 to simply use the measured parameter from the sensor 104 as a random number sequence to be provided to the communication system 110. In this regard, as described above, the measured characteristic of the power signal varies randomly due to several factors mentioned above, and the value received from the sensor 104 for a given measurement should, therefore, be a random number. However, in some embodiments, the random number generation logic 122 is configured to process multiple samples from the sensor 104 in order to generate a single random number sequence output by the random number generator 105 in an effort to enhance the randomness of the sequence. Exemplary techniques for processing multiple samples of the power signal to generate a random number will be described in more detail below. However, it should be emphasized that such techniques are exemplary, and other techniques may be used in other embodiments.

In one exemplary embodiment, the random number generation logic 122 processes at least two different samples (e.g., two consecutive samples) measured by the sensor 104 at different times in order to generate a random number sequence. In this regard, the logic 122 is configured to mathematically combine the samples in order to provide a combined value. As an example, the logic 122 may subtract the value of a first sample from the sensor 104 from the value of another sample from the sensor 104 to determine a difference between the two samples. In other embodiments, other types of operations may be used to combine the samples, and any number of samples may be combined to provide a combined value.

In some embodiments, the combined value may be a decimal value, and the logic 122 may be configured to convert the decimal value into an integer. As an example, the logic 122 may multiply the decimal value with a fixed number (such as a predefined constant). In other embodiments, the decimal value may be converted to an integer by rounding the decimal value to the nearest integer. In other embodiments, yet other techniques for converting the fractional value to an integer may be possible.

Furthermore, the logic 122 may be configured to convert the resulting integer to a binary digit sequence. In an exemplary embodiment, the resulting bit sequence may be permitted to have non-uniform distribution, with either predominating 0's or predominating 1's in the sequence. In other embodiments, the random number generation logic 122 processes the bit sequence to ensure that it has uniform distribution of 0's and 1's (e.g., an equal number of 0's and 1's), as will be described below.

In this regard, the random number generation logic 122 may perform a debasing algorithm on the bit sequence in order to generate an unbiased random number sequence with substantially equal distribution of 0's and 1's. In an exemplary embodiment, the logic 122 may be configured to apply Von Neumann debasing algorithm on the resulting bit sequence to achieve this purpose. In such an embodiment, the logic 122 is configured to analyze pairs of consecutive bits in the number sequence. For each pair, the logic 122 may be configured to choose the first bit if two consecutive bits are different and may be configured to reject both the bits if they are same. As an example, a pair of bits 1 0 may be converted to 1 after applying von Neumann algorithm and a pair of bits 0 0 may be rejected. In other embodiments, other debasing techniques may be used, such as applying exclusive-or logical operation on each pair of random bits.

Furthermore, after generating a random number sequence as described above, the random number generation logic 122 may store the sequence in memory 121. As additional random number sequences are generated according to the techniques described above, the logic 122 may be configured to concatenate or otherwise combine multiple random number sequences to form a larger random number. Once the size of the random number exceeds a specified threshold (e.g., the threshold received from the communication system 110), the logic 122 may be configured to provide the random number to the communication system 110 and then begin generating a new random number as may be desired.

Figure 4:
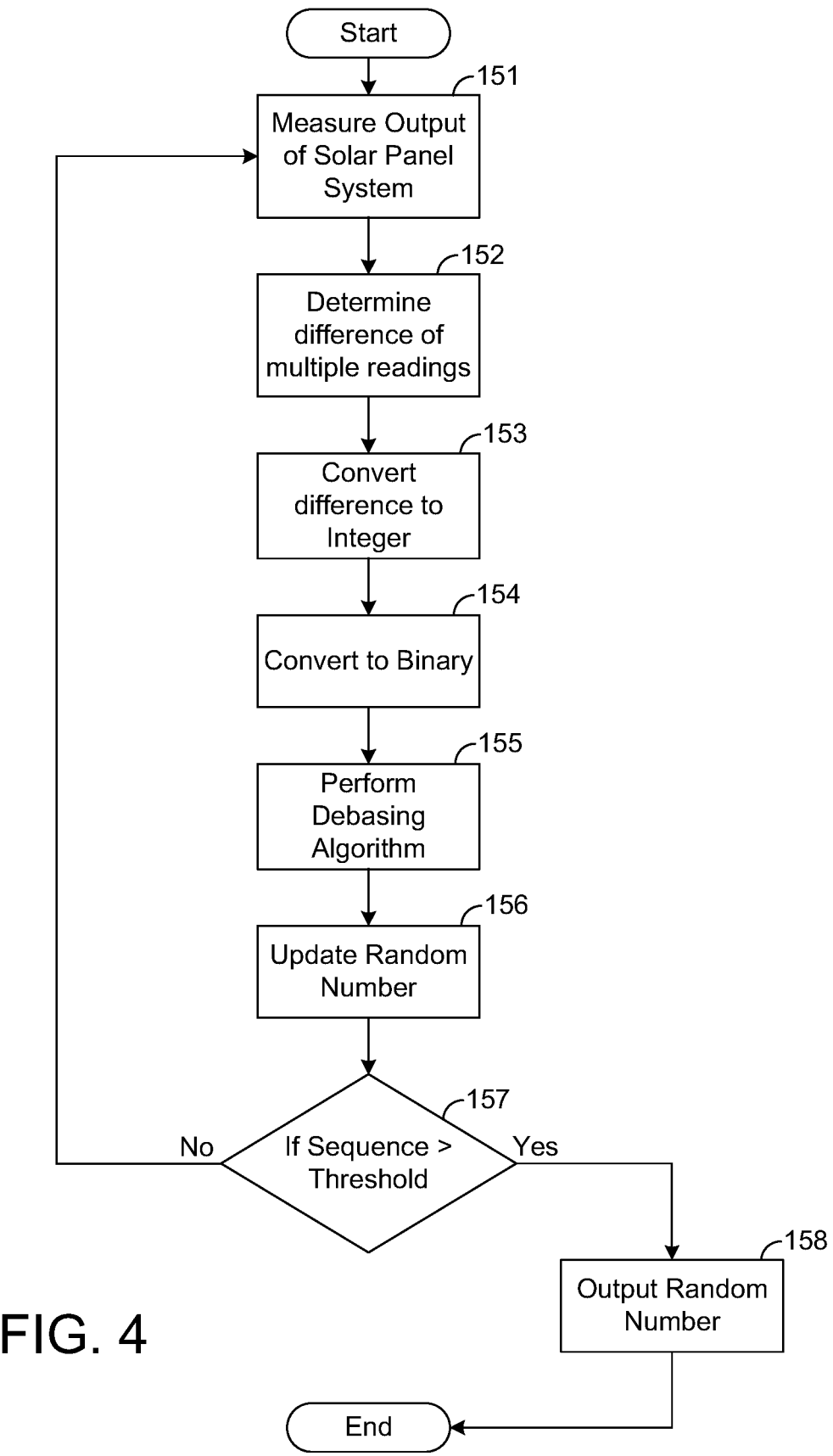
FIG. 4 is a flow chart illustrating an exemplary operation of a random number generation system, such as is depicted by FIG. 2.

FIG. 4 is a flow chart illustrating an exemplary operation of the random number generation system 100. For example, assume that the communication system 110 has a set of data to be encrypted and transmitted by the transmitter 112. Further assume that the encryption algorithm used by the transmitter 112 requires a random number of a certain bit length. In such an example, the communication system 110 may transmit to the random number generator 105 a threshold value indicative of the bit length required for the random number. The random number generator 105 may store the threshold in the memory 121 then generate a random number of a sufficiently large bit length to satisfy threshold.

In this regard, the sensor 104 measures a characteristic (e.g., voltage or current) of a power signal from the solar power system 100, such as the power signal from the combiner 103, as shown by bock 151, and transmits data indicative of the measured sample, referred to hereafter as "first sample," to the random number generator 105. The sensor 104 then repeats this step at a later time (e.g., the next measurement) to provide another measured sample, referred to hereafter as "second sample," to the random number generator 105. Note that these samples may be defined with an analog signal or a digital signal as may be desired.

After receiving the first and second samples measured in block 151, the random number generation logic 122 subtracts the samples to determine a difference between the first sample and the second sample, as shown by block 152 of FIG. 4. Note that the obtained difference may be a decimal value, and the logic 122 may be configured to convert the decimal value into an integer value, as shown by block 153, by multiplying the decimal value obtained from the previous step (block 152) with a fixed number. Furthermore, as depicted by block 154, the logic 122 converts such integer value to a binary sequence.

The binary sequence (from block 154) may contain either predominant 0's or predominant 1's. To remove this biasing, the logic 122 may be configured to apply debasing algorithm, as shown by block 155. The resulting bits, after applying a debasing algorithm in block 155, may be an unbiased random number sequence with equal distribution of 0's and 1's in the number sequence.

The resulting random bit sequence, from the aforementioned step (block 155), may be used to update the random number to be provided to the communication system 110, as shown by bloc 156. In this regard, the first random number bit sequence generated by steps 151-155 may be stored in memory 121 as the initial version of the random number. Thereafter, as will be described in more detail below, additional random bit sequences may be generated and added (e.g., concatenated) to the random number stored in memory 121 to form a larger random number. In this regard, after each update of the random number stored in memory 121, the logic 122 may be configured to check if the bit length of the random number in memory 121 now exceeds the threshold provided by the communication system 110, as shown by block 157. If so, the logic 122 may communicate the updated random number from block 156 to the communication system 110 for use in encrypting the data, as shown by block 158.

On the other hand, if the bit length of the updated number in memory 121 does not exceed the threshold provided by the communication system 110, the logic 122 may be configured to perform blocks 151-156 again in order to generate a new random number sequence that is added to the random number in memory 121 to increase its bit length, until the threshold is exceeded and the logic 122 may then transfer the updated number sequence to the communication system 110.

Accordingly, the random number generator 105 is able to leverage the randomness of the output of the solar power system 101, as well as the circuitry of the solar power system 101, to provide a number that is truly random. In this regard, the same circuitry that is used to generate and measure a power signal for the purpose of solar power generation and management may also be used to provide a seed value to the random number generator 105 for use in the algorithm to generate a random number. Thus, the overall cost to provide random number generation can be reduced or mitigated while achieving a robust algorithm for generating a number that is truly random.

Now, therefore, the following is claimed:

1. A random number generation system, comprising:
   a plurality of solar power panels configured to convert light into electrical energy;
   a combiner configured to combine electrical energy from each of the plurality of solar power panels to form a power signal;
   a sensor configured to measure a parameter of the power signal;
   a random number generator configured to generate a random number based on the measured parameter;
   a communication system configured to receive at least one random number from the random number generator; and
   an unmanned aerial vehicle (UAV), wherein the plurality of solar power panels, the sensor, the random number generator, and the communication system reside on the UAV, and wherein the communication system is configured to use the at least one random number for wireless communications.

2. The random number generation system of claim 1, wherein the sensor is configured to provide a first sample of the measured parameter of the power signal and a second sample of the measured parameter of the power signal, and wherein the random number generator is configured to combine the first sample and the second sample to provide a combined value and to generate the random number based on the combined value.

3. The random number generation system of claim 2, wherein the random number generator is configured to form the combined value by subtracting the first sample and the second sample.

4. The random number generation system of claim 2, wherein the random number generator is configured to convert the combined value into binary to form a binary value.

5. The random number generation system of claim 4, wherein the random number generator is configured to perform a debasing algorithm on the binary value for reducing a bias of the binary value toward 0's or 1's.

6. The random number generation system of claim 2, wherein the random number generator is configured to convert the combined value from a decimal value to an integer and to convert the integer to a binary value.

7. The random number generation system of claim 1, wherein the communication system has at least one of a transmitter or receiver configured to communicate at least one message that is encrypted or decrypted based on the at least one random number.

8. The random number generation system of claim 1, wherein the communication system communicates a value indicative of a minimum number of bits for the random number to the random number generator.

9. The random number generation system of claim 1, wherein the combiner is configured to distribute the power signal to power at least one component of the UAV.

10. The random number generation system of claim 1, wherein the random number generator is configured to combine multiple random numbers to form a larger random number.

11. A random number generation method, comprising:
    receiving light with a plurality of solar power panels, wherein the plurality of solar power panels are located on an unmanned aerial vehicle (UAV);
    converting the light into electrical energy with the plurality of solar power panels;
    combining electrical energy from each of the plurality of solar power panels to form a power signal;
    measuring a parameter of the power signal with a sensor, wherein the sensor is located on the UAV;
    generating a random number based on the measured parameter with a random number generator, wherein the random number generator is located on the UAV; and
    providing the generated random number to a communication system, wherein the communication system is located on the UAV and configured to use the generated random number for wireless communications.

12. The random number generation method of claim 11, further comprising using the random number, by the communication system, to encrypt or decrypt data.

13. The random number generation method of claim 11, wherein the measuring comprises providing a first sample of the measured parameter of the power signal and providing a second sample of the measured parameter of the power signal, and wherein the generating comprises combining the first sample and the second sample to form a combined value.

14. The random number generation method of claim 13, wherein the combining comprises subtracting the first sample and the second sample.

15. The random number generation method of claim 13, wherein the generating further comprises converting the combined value into binary to form a binary value.

16. The random number generation method of claim 15, wherein the generating further comprises performing a debasing algorithm on the binary value for reducing a bias of the binary value toward 0's or 1's.

* * * * *